(12) United States Patent
Beierle et al.

(10) Patent No.: US 6,552,832 B1
(45) Date of Patent: *Apr. 22, 2003

(54) TELECOMMUNICATIONS SYSTEM INCLUDING TRANSMULTIPLEXER INSTALLED BETWEEN DIGITAL SWITCH AND OPTICAL SIGNAL TRANSMISSION FIBER

(75) Inventors: John D. Beierle, Southbury, CT (US); William C. G. Ortel, New York, NY (US); Jacob Needle, Dix Hills, NY (US)

(73) Assignee: Telesector Resources Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/285,027

(22) Filed: Apr. 1, 1999

Related U.S. Application Data (63) Continuation-in-part of application No. 08/726,641, filed on Oct. 7, 1996, now Pat. No. 6,009,084, and a continuation-in-part of application No. 08/806,090, filed on Feb. 25, 1997, now Pat. No. 6,055,077.

(51) Int. Cl.[7] .............................. H04J 4/00; H04J 14/08; H04J 14/02
(52) U.S. Cl. ....................... 359/123; 359/137; 359/125; 370/478
(58) Field of Search ................................. 359/123, 125, 359/121, 137; 370/307, 478

(56) References Cited

U.S. PATENT DOCUMENTS

| | | | |
|---|---|---|---|
| 4,199,660 A | 4/1980 | Dill et al. ..................... 370/50 |
| 4,237,551 A | 12/1980 | Narasimha .................... 370/50 |
| 4,304,000 A | 12/1981 | Bonnerot et al. .............. 370/70 |
| 4,813,035 A | 3/1989 | Bishop et al. ................. 370/50 |
| 4,994,909 A | 2/1991 | Graves et al. ................. 358/86 |
| 5,038,342 A | 8/1991 | Crisler et al. ................. 370/50 |
| 5,038,344 A | 8/1991 | Kawamura .................... 370/70 |
| 5,221,983 A | 6/1993 | Wagner ...................... 359/125 |
| 5,351,234 A | 9/1994 | Beierle ....................... 370/49.5 |
| 5,406,553 A | 4/1995 | Smith et al. ................ 370/49.5 |
| 5,625,624 A | 4/1997 | Rosen et al. ................. 370/307 |
| 5,694,234 A | * 12/1997 | Darcie et al. ............... 359/121 |
| 5,764,754 A | 6/1998 | Ortel et al. .................. 379/399 |
| 5,896,213 A | * 4/1999 | Nagahori et al. ........... 359/137 |
| 6,009,084 A | * 12/1999 | Beierle et al. .............. 370/307 |

OTHER PUBLICATIONS

I. Sakakibara et al. "Trial of CATV, VOD and ISDN Services over FTTH", Proceedings, 3rd International Workshop on Community Networking, IEEE, 1996.*

* cited by examiner

*Primary Examiner*—Jason Chan
*Assistant Examiner*—Shi K. Li
(74) *Attorney, Agent, or Firm*—Leonard C. Suchyta; Loren C. Swingle; Michael Straub (57) ABSTRACT

A telecommunications system provides telephone services to subscriber locations over dedicated optical fibers which extend in a "star" configuration from a telephone central office. A transmultiplexer installed at the central office is connected between a digital switch and the optical fibers. The transmultiplexer has a plurality of FDM ports, each of which is connected to a respective one of the optical fibers. The transmultiplexer is connected by one or more TDM ports to the digital switch. Preferably, the transmultiplexer provides a concentrating function whereby the number of subscriber lines served by the transmultiplexer is greater than the total voice-grade channel capacity of the connection between the transmultiplexer and the digital switch.

27 Claims, 9 Drawing Sheets

SYSTEM OVERVIEW

FIG. 4    RECEIVER AT SUBSCRIBER LOCATION

ONE FDM PORT SHARED BY TWO FIBERS

TELECOMMUNICATIONS SYSTEM INCLUDING TRANSMULTIPLEXER INSTALLED BETWEEN DIGITAL SWITCH AND OPTICAL SIGNAL TRANSMISSION FIBER

CROSS REFERENCE TO RELATED APPLICATIONS

This is a continuation-in-part of application Ser. No. 08/726,641, entitled "Concentrating Transmultiplexer for Cable Telephony," filed Oct. 7, 1996 which issued as U.S. Pat. No. 6,009,084 and a continuation-in-part of U.S. patent application Ser. No. 08/806,090, entitled "Multimedia Distribution System Using Fiber Optic Lines" filed Feb. 25, 1997 which issued as U.S. Pat. No. 6,055,077.

BACKGROUND OF THE INVENTION

This invention relates to telecommunications systems in which telephone signals are distributed via optical fibers.

U.S. Pat. No. 5,351,234, which has common inventors with the present application, discloses a system in which video signals are distributed, and switched telephone services provided, over a common broadband cable network. The disclosure of U.S. Pat. No. 5,351,234 is incorporated herein by reference.

The above-referenced related patent application, namely Ser. No. 08/726,641, has the same inventors as the '234 patent. The disclosure of the '641 application is also incorporated herein by reference.

The '641 patent application represents an improvement over the cable telephony system of the '234 patent. Specifically, the '641 application is concerned with a transmultiplexer, which is a device that provides signal translation between the TDM (time division multiplex) digital signal format employed in a digital telephone switch, and an FDM (frequency division multiplex) signal format employed in the cable transmission system. A salient aspect of the disclosure of the '641 application calls for the transmultiplexer to provide "concentration". That is, the number of subscriber lines served by the transmultiplexer is larger than the number of digital signal channels which interconnect the transmultiplexer with the digital switch.

One of the present inventors has recognized that it may be advantageous to provide telephony and other communication services to subscriber locations by means of dedicated optical communication fibers, with the communication system designed according to a "star" architecture such that each of the optical fibers is dedicated to a single subscriber location, and extends directly between the respective subscriber location and a telephone central office location. Of course, it would be desirable that the switching function at the central office be carried out through conventional digital switching equipment. The question of how to provide a suitable interface between the digital switch and the star-configuration optical fiber network therefore arises.

It is a primary object of the invention to provide a transmultiplexer for translating between the respective signal formats of a digital switch and a dedicated-optical-fiber telecommunications system.

It is a further object of the invention to provide a telecommunications system in which the cost of switching equipment is minimized.

SUMMARY OF THE INVENTION

In accordance with the principles of the present invention, the above and other objects are realized by providing a system for transmitting public-switched-telephone-network signals between a digital switch installed at a central office location and a plurality of telephone subscriber locations, wherein the system includes the following components:

(a) a plurality of optical fibers, each interconnecting a respective one of the subscriber locations with the central office location;

(b) a first plurality of optical transceiver devices, each connected to a respective one of the optical fibers at the central office location, wherein each of the transceiver devices includes a facility for transmitting a downstream signal to the respective subscriber location over the respective optical fiber by analog lightwave modulation and for receiving and demodulating an upstream signal transmitted from the respective subscriber premise location over the respective optical fiber by analog light wave modulation; and (c) a second plurality of optical transceiver devices, each located at a respective one of the subscriber locations and connected to the respective optical fiber, each of the transceiver devices of the second plurality being for transmitting an upstream signal to the central office location over the respective optical fiber by analog lightwave modulation and for receiving and demodulating a downstream signal transmitted from the central office location over the respective optical fiber by analog lightwave modulation; and (d) a transmultiplexer, which includes:

(1) at least one digital signal port connected to the digital switch for receiving digital telephone signals from the digital switch in a TDM format and for transmitting digital telephone signals in the TDM format to the digital switch, the telephone signals received and transmitted by the at least one digital signal port corresponding to a plurality of voice-grade digital telephone channels;

(2) a plurality of analog signal ports each connected to a respective one of the optical transceiver devices of the first plurality, and each of the analog signal ports being for receiving from the respective optical transceiver device of the first plurality analog telephone signals corresponding to a plurality of voice-grade analog telephone channels in an FDM format and transmitted through the respective optical fiber, each of the analog signal ports also being for transmitting to the respective optical transceiver device of the first plurality analog telephone signals in the FDM format for the plurality of voice-grade analog telephone channels;

(3) circuitry connected between the at least one digital port and the plurality of analog signal ports for translating telephone signals between the TDM and FDM formats; and (4) a control circuit for selectively coupling any of the voice-grade digital telephone channels to any of the voice-grade analog telephone channels.

One particularly notable feature of the telecommunications system provided according to the invention is that the subscriber side of the transmultiplexer is made up of a number of analog signal ports, each corresponding to and connected to a respective one of the dedicated optical fibers. The same transmission frequency band is preferably used at each of the analog signal ports, so that bandwidth is conserved for other services that may be provided via the optical fibers.

Preferably the transmultiplexer also provides a concentration function, whereby the total capacity of the analog (subscriber-side) signal ports is greater, in terms of voice-grade telephone channels, than the capacity, in terms of digital telephone channels, of the digital signal port or ports. Indeed, concentration by a factor of two or more is contemplated. This saves on the cost of digital switching capacity, including the cost of interface circuits at the digital switch, since the number of subscriber-side ports on the digital switch is less than the number of subscriber telephone lines actually to be served.

As in the above-referenced '641 application, the concentration function is to be achieved by managing both the transmultiplexer and the digital switch through a separate host computer. The transmultiplexer includes a host interface circuit which receives command messages from the host computer and responds to those messages by assigning subscriber channels to digital switch channels on a per call basis.

According to another aspect of the invention, there is provided a transmultiplexer which includes at least one TDM interface for receiving and transmitting digital telephone signals in a TDM format from and to a digital signal transmission facility, a buffer memory coupled to the at least one TDM interface for temporarily storing the digital telephone signals, translation circuitry coupled to the buffer memory for translating the digital telephone signals between the TDM format and an FDM format, a plurality of FDM ports for receiving and transmitting analog telephone signals in the FDM format, and a plurality of A/D conversion circuits each coupled between a respective one of the FDM ports and the translation circuitry, wherein the A/D conversion circuits convert analog telephone signals in the FDM format into digital telephone signals in the FDM format, and convert digital telephone signals in the FDM format into analog telephone signals in the FDM format. The transmultiplexer further includes a control circuit coupled to the buffer memory, the translation circuit and the A/D conversion circuits for transmitting control signals for the purposes of controlling respective durations of periods during which the buffer memory stores the digital telephone signals in the TDM format, controlling the translation circuit to transmit and receive digital signals in the FDM format to and from selected ones of the A/D conversion circuits, and controlling selected ones of the A/D conversion circuits to receive and transmit digital signals in the FDM format from and to the translation circuitry.

BRIEF DESCRIPTION OF THE DRAWINGS

The above and other features, advantages and aspects of the present invention will become more apparent upon reading the following detailed description in conjunction with the accompanying drawings in which.

DETAILED DESCRIPTION

Preferred embodiments of the invention will now be described with reference to the drawings.

Figure 1:
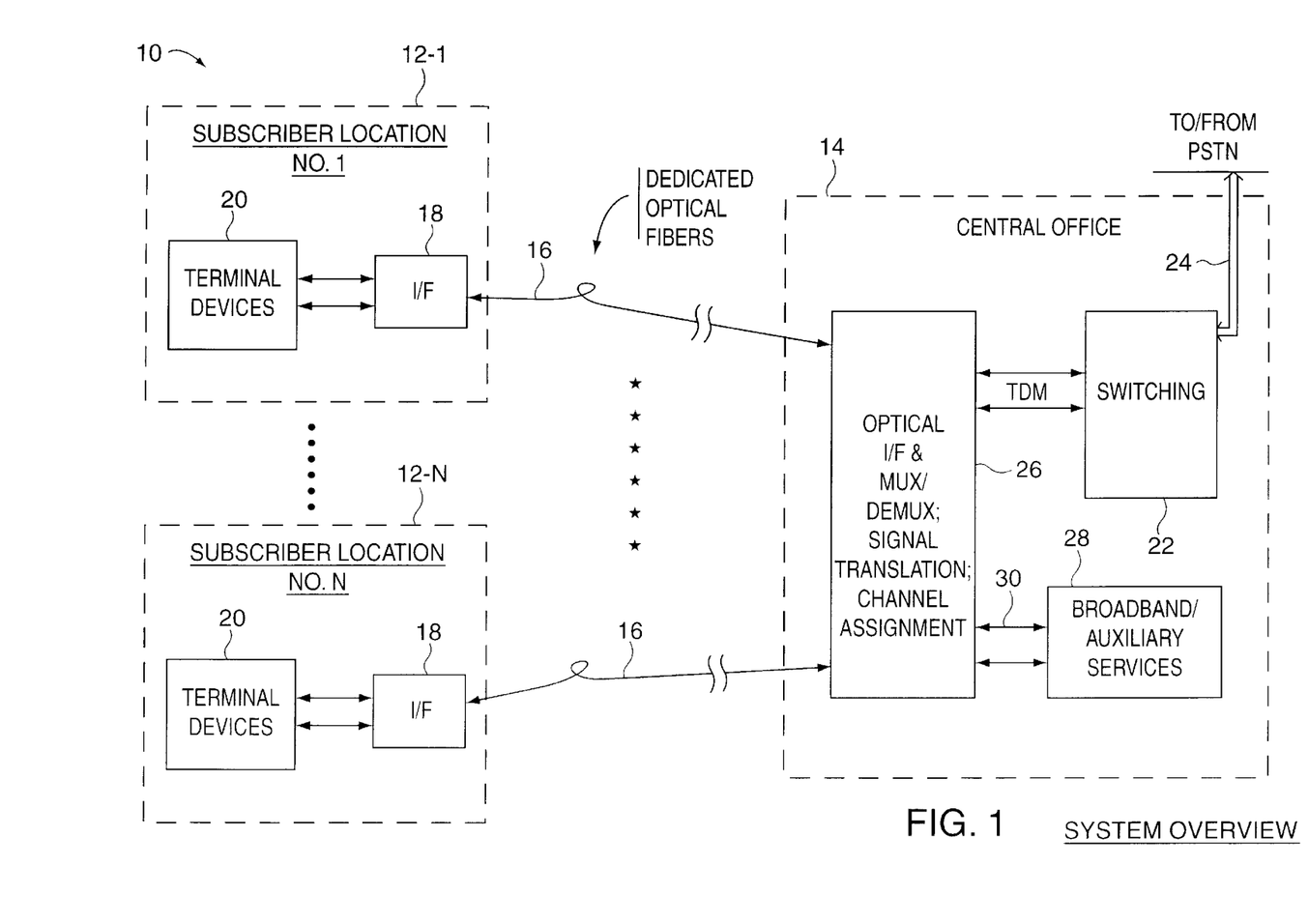
FIG. 1 is a schematic block-diagram representation of an optical-fiber-based telecommunications system having a "star" architecture and provided in accordance with the invention.

FIG. 1 illustrates, in schematic terms, a telecommunications system provided in accordance with the invention. Reference numeral 10 generally indicates the telecommunications system. As shown in FIG. 1, the system 10 includes a plurality of subscriber locations 12-1 through 12-N and a central office location 14. It is to be understood that each subscriber location may correspond to a telephone subscriber's physical premises such as a residence, a business, an office, a non-profit institution, etc.

The system 10 also includes optical communication fibers 16 with a respective fiber 16 dedicated to each subscriber location 12, and physically extending from the subscriber location 12 to the central office 14. In physical as well as schematic terms, the fibers 16 radiate outwardly from the central office location 14 to the subscriber locations 12, and would therefore properly be referred to as representing a "star" architecture for the telecommunications system 10.

It will be noted that each subscriber location includes a respective installation of an interface device 18 connected to the respective optical fiber 16, as well as a plurality of communications terminal devices 20 which are connected to the interface device 18. It is assumed that the terminal devices 20 include one or more devices such as a conventional telephone terminal, a fax machine, a computer modem, and a telephone answering machine. The terminal devices 20 at a given subscriber location may also include a high speed modem of a type which is not suitable for use with a conventional telephone line, a video-teleconferencing terminal, and one or more analog or digital set-top boxes of the type which selects among cable-cast video channels and feeds the selected video channel to a television set or video monitor.

The equipment installed at the central office 14 may, in some respects, be entirely conventional. For example, the switching equipment indicated at 22 may be constituted by a conventional digital switch, and may be connected in a conventional manner to send and receive signals via the public switched telephone network (PSTN). The connection between the switching equipment 22 and the PSTN is indicated at 24. As is customary with conventional digital switches, the telephone signals handled by the switching equipment 22 are in a time division multiplex (TDM) format. The TDM telephone signals are transmitted between the switching equipment 22 and a group of electronic devices that are indicated by block 26 in FIG. 1 and are interposed between the switching equipment 22 and the optical fibers 16. The devices represented by block 26 perform a number of functions which will be described below, but can be summarized as including interfacing to the optical fibers 16, signal multiplexing and demultiplexing, signal format translation and telephone signal channel assignment.

According to a preferred embodiment of the invention, there is also installed in the central office electronic equipment which receives and processes signals to be transmitted through the fibers 16 that are different from the telephone signals handled by the switching equipment 22. These signals other than the telephone signals will henceforth be referred to as "broadband" or "auxiliary" signals, and the equipment for receiving such signals from or supplying such signals to the equipment represented by block 26 is represented by block 28 in FIG. 1. The equipment represented by block 28 may include equipment such as a satellite downlink (not separately shown) which receives television programming in a number of channels. The television programming is then supplied to the equipment represented at block 26 via a connection 30. The equipment represented by block 28 may also transmit signals bi-directionally, as in the case of data services, video teleconferencing services, etc.

Figure 2:
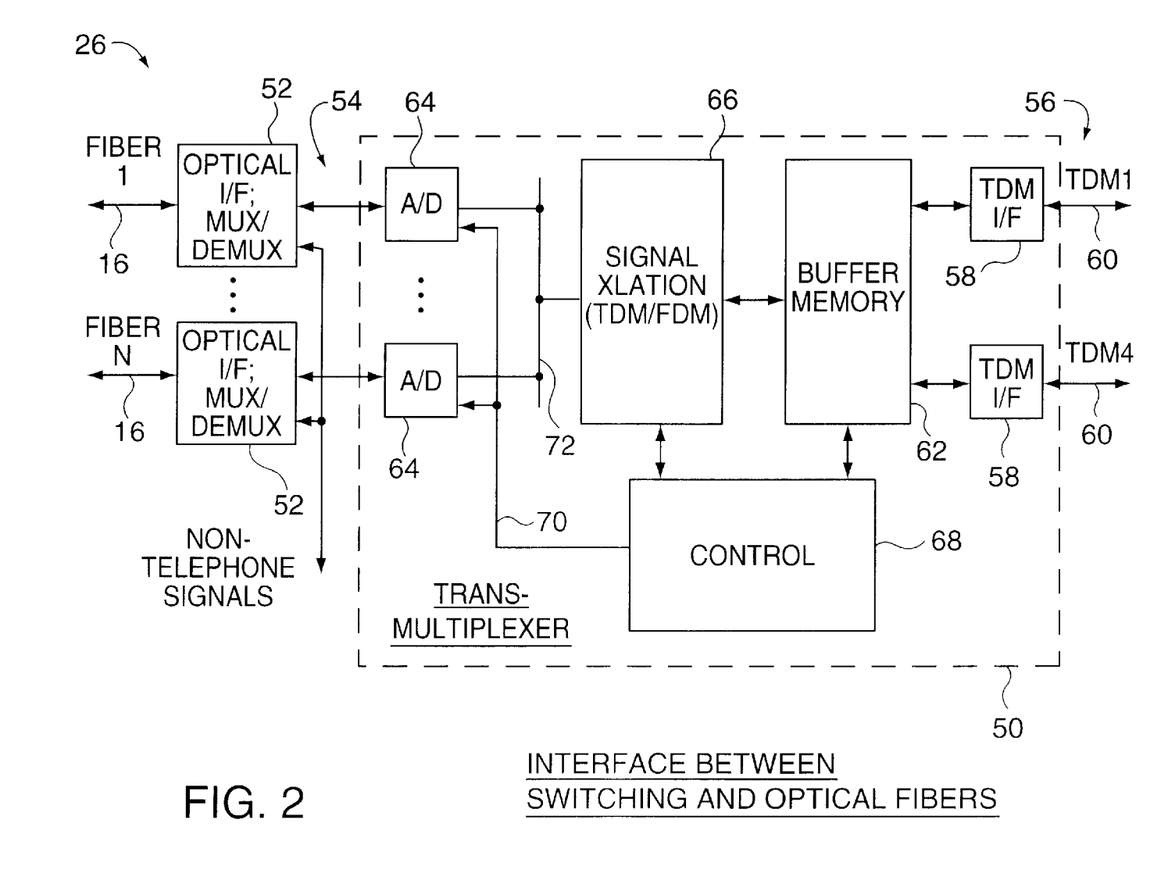
FIG. 2 illustrates in block-diagram form details of a block in FIG. 1 which represents interface circuitry provided between a switching function and optical signal transmission fibers.

FIG. 2 illustrates details of the equipment represented by block 26 in FIG. 1. Essentially, the equipment shown in FIG. 2 consists of a transmultiplexer 50 and optical fiber interface devices 52. The transmultiplexer 50 has a plurality of FDM signal ports at a downstream side 54 of the transmultiplexer and a plurality of TDM signal ports at an upstream side 56 of the multiplexer. Each of the optical interface devices 52 serves to interconnect a respective optical fiber 16 with a corresponding one of the FDM ports. Details of the optical interface devices and associated devices will be described below.

As seen at the upstream side 56 of the transmultiplexer 50, TDM interfaces 58 are provided as part of the transmultiplexer 50. Each of the TDM interfaces 58 is connected to a respective TDM signal connection 60. The TDM connections 60 transmit telephone signals in a TDM format between the transmultiplexer 50 and the switching equipment 22 shown in FIG. 1.

Continuing to refer to FIG. 2, the TDM interfaces 58 convert serial sequences of serial, compressed TDM signals received from the switching equipment to a serial sequence of parallel, linearly encoded TDM signals. A reverse conversion is made at the TDM interfaces 58 of signals bound from the transmultiplexer 50 to the switching equipment.

Connected to the TDM interfaces 58 is a buffer memory 62. The downstream-bound parallel, linearly encoded TDM signals output from the TDM interfaces 58 are stored in the buffer memory 62. The buffer memory 62 also stores upstream-bound parallel, linearly encoded TDM signals which are to be transmitted to the switching equipment via the TDM interfaces 58. As will be more fully understood from subsequent discussion, both upstream-bound and downstream-bound TDM signals are stored in the buffer memory in a first sequence and read out in a different sequence from the sequence in which the signals were stored. The re-sequencing of the signals effects an assignment between TDM channels at the upstream side of the transmultiplexer 50 and FDM channels at the downstream side of the transmultiplexer 50. According to a first preferred embodiment of the multiplexer, four TDM ports are provided at the upstream side, and each port has a capacity of 30 voice-grade channels. An equal number of FDM channels is provided according to this embodiment at the downstream side of the transmultiplexer. Preferably the 120 FDM channels are divided equally among 20 FDM ports, so that each FDM port is capable of handling up to six voice grade telephone channels simultaneously.

Corresponding to each of the FDM ports is a respective A/D circuit 64. The A/D circuits 64 convert analog FDM electrical telephone signals received at the respective port into digital signals in an FDM format, and also convert digital, downstream-bound digital signals in the FDM format into an analog FDM signal to be coupled to the respective optical fiber 16 via the respective interface circuit 52.

Signal translation circuitry 66 is connected between the buffer memory 62 and the A/D circuits 64 to provide translation between the TDM format in which the signals are stored in the buffer memory 62 and the FDM format in which the signals are output from or supplied to the A/D circuits 64.

The signal translation circuitry 66 may be implemented in the form of a separate dedicated translation circuit interposed between each of the A/D circuits 64 and the buffer memory 62, in which case the number of translation circuits is the same as the number of A/D circuits. However, according to a preferred embodiment of the transmultiplexer 50, each of the 20 FDM ports operates at the same frequency band (i.e., the same frequency band is reused in each of the ports), which may make it advantageous to time-share a single translation circuit among all of the A/D circuits 64, thereby sharing the same translation circuit among all of the FDM ports of the transmultiplexer.

The transmultiplexer 50 also includes a control circuit 68. The control circuit 68 is connected to exchange control and status signals with the buffer memory 62 and the signal translation circuit 66. The control circuit 68 also provides control signals to the A/D circuits 64 via a control bus 70. The control circuit governs the times at which the TDM signals for each channel (in both upstream and downstream directions) are written into the buffer memory 62 and read from the buffer memory, so that the time sequence of the TDM signals can be arranged arbitrarily to establish any desired relationship between the TDM channels in the TDM ports and the FDM channels in the FDM ports. More specifically, control signals generated by the control circuit 68, and applied to the buffer memory 62, control the sequence in which TDM signals previously stored in the buffer memory 62 are read out from the buffer memory. Consequently, the control circuit 68 effects control over the respective durations of periods of time during which the TDM signals are stored in the buffer memory 62.

The control circuit 68 generates further control signals which are applied to the signal translation circuit 66 so that TDM signals read out from the buffer memory 62 or to be stored in the buffer memory 62 are transmitted to or received from an appropriate one of the A/D circuits 64. Further control signals generated by the control circuit 68 and transmitted on control bus 70 control the timing at which the A/D circuits 64 operate to receive and transmit signals in the FDM format. In effect, the control signals transmitted on a control bus 70 control access to a data bus 72 which connects the translation circuitry 66 to the A/D circuits 64.

The nature and timing of the control signals generated by the control circuit 68 are a product of programming signals which are stored in the control circuit 68. The programming signals may be input into the control circuit 68 by a programming device (not shown) which may be utilized to program the assignments between the FDM channels and the TDM channels.

Figure 3:
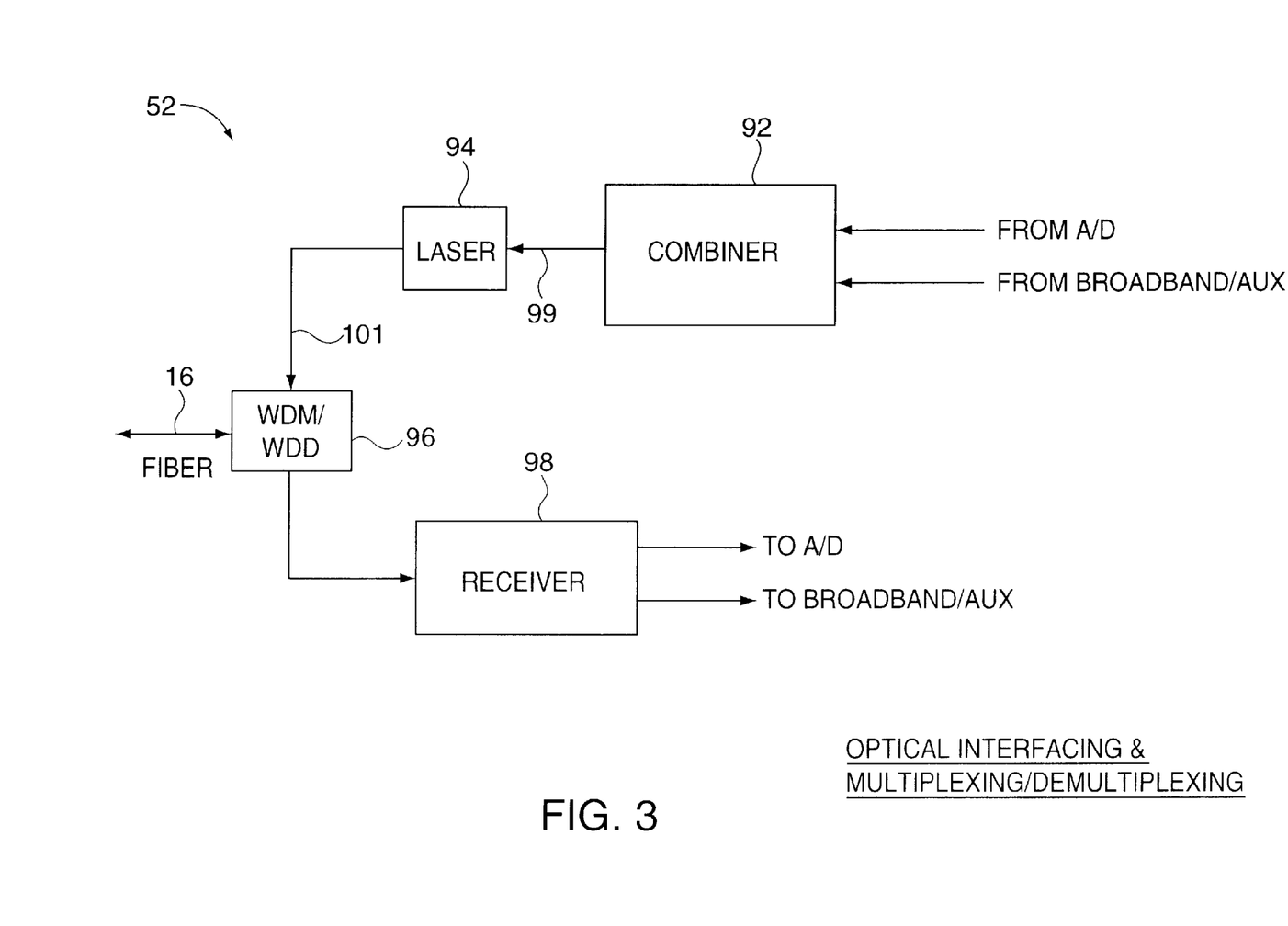
FIG. 3 is a block diagram which illustrates details of a typical one of the optical interface circuits shown in FIG. 2.

FIG. 3 shows details of a typical one of the interface circuits 52 shown in FIG. 2. As seen from FIG. 3, the interface circuit 52 is made up of a combiner circuit 92, a laser 94, a passive wave division multiplexer/wave division demultiplexer (WDM/WDD) 96 and a receiver circuit 98. The combiner 92 receives downstream-bound telephone signals from a respective one of the A/D circuits 64 shown in FIG. 2, and also receives other types of downstream-bound signals, such as television signals, from the broadband/auxiliary services source equipment 28 shown in FIG. 1. The combiner 92 functions as a radio frequency modulator which frequency shifts the base band frequency components of the various electric signals which it receives into pre-defined frequency bands. Many frequency band arrangements are possible, including one in which the telephone signals are transmitted in a suitable band around 5 MHz, analog video signal channels occupy a band which extends from about 50 to about 650 MHz, and a frequency band of about 850 to 1,000 MHz is used for digital video signal channels. Frequency bands between 5 and 50 MHz may be employed for other services such as data services and video teleconferencing.

The combiner 92 delivers a single modulated electrical output signal, composed of frequency-shifted base band signals on a path 99 to laser 94. The single electrical signal carried on path 99 is used to modulate the optical output of laser 94 (which in a preferred embodiment of the invention has a nominal optical wavelength of 1310 nm) to generate a modulated optical output signal on a path 101 which emanates from laser 94. The modulated optical output signal carried on path 101 is delivered to WDM/WDD 96 for propagation over fiber 16 to the corresponding one of the subscriber locations 12 (FIG. 1).

Upstream-bound optical signals received via the fiber 16 at WDM/WDD 96 are provided in optical form to receiver 98. Receiver 98 receives the resulting optical signal, and outputs demultiplexed electrical signals to the respective A/D circuit 64 (FIG. 2) and to the broadband/auxiliary services circuit 28 (FIG. 1).

The electro-optical and optical device arrangement shown in FIG. 3 also essentially represents the configuration of the respective interface device 18 which is provided at each subscriber location (FIG. 1). The principal differences between the interface 52 (FIG. 2) provided at the central office and the subscriber interface device 18 are as follows:

(a) Preferably the laser included in the subscriber interface 18 operates at a different nominal wavelength from that of the central office lasers. For example, the subscriber lasers may have a nominal wavelength of 1550 nm.

(b) Of course, the combiner circuit provided in the subscriber interface 18 receives its inputs from various terminal devices and the same terminal devices are the destinations for the demultiplexed electrical signals output from the receiver circuit included in the subscriber interface 18.

(c) In addition, the subscriber receiver circuit is constructed somewhat differently from the receiver included in the central office interface 52.

Figure 4:
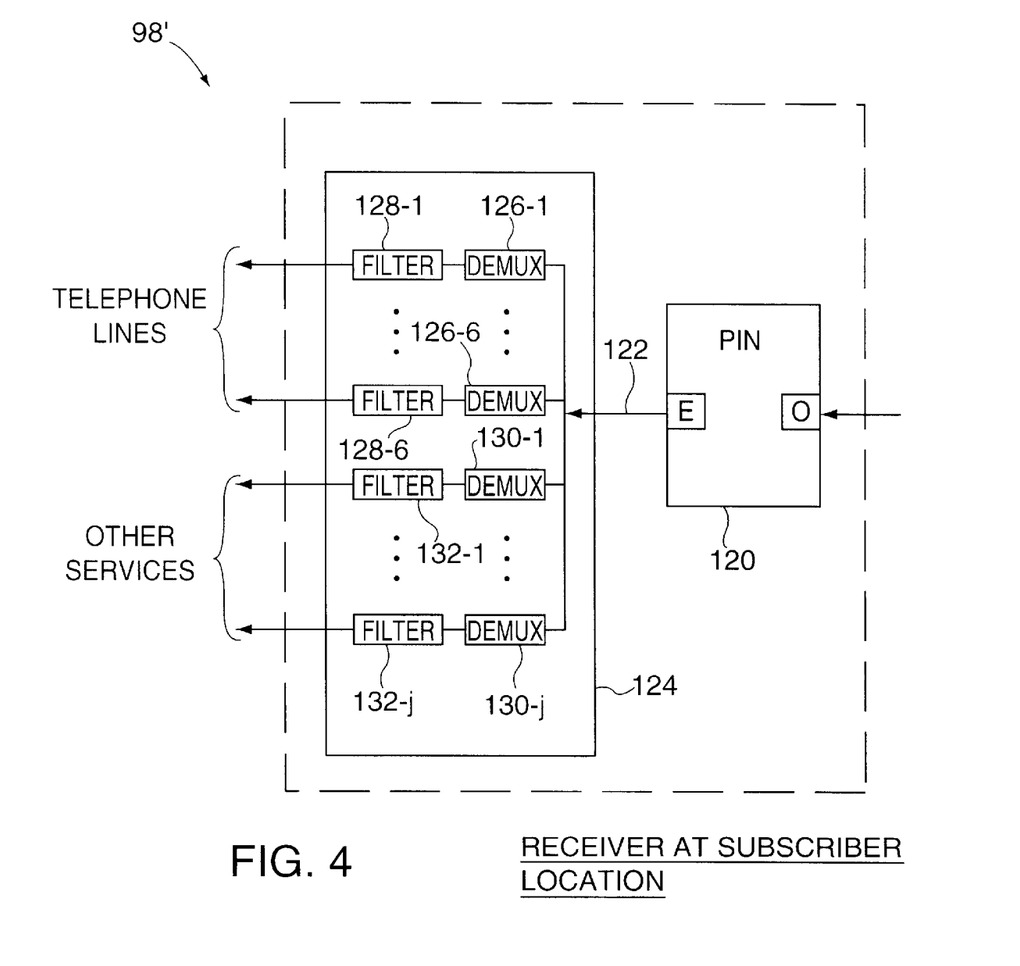
FIG. 4 illustrates, in block-diagram form, certain details of a typical receiver circuit provided at a subscriber location as part of the system of FIG. 1.

Details of the subscriber receiver are shown in FIG. 4. In FIG. 4, reference numeral 98' generally indicates the subscriber receiver device. The receiver 98' includes a PIN diode detector 120 which receives the downstream-bound optical signal at port O and provides a multiplexed electrical output signal from port E to a path 122. The receiver 98' also includes an electrical demultiplexer 124 for converting the multiplexed signal on path 122 to individual base band signals. The demultiplexer 124 is composed of a first bank of demultiplexers 126-1 through 126-6, a first bank of filters 128-1 through 128-6, a second bank of demultiplexers 130-1 through 130-j and a second bank of filters 132-1 through 132-j. The demultiplexers of the two banks and the filters of the two banks are arranged in pairs such that, for example, demux 126-1 and filter 128-1 form a cascade pair, demux 126-6 and filter 128-6 form another cascade pair, demux 130-1 and filter 132-1 form still another cascade pair, and so forth.

The function of each demux-filter pair is to frequency shift each pass band signal to base band. The six demux-filter pairs of the first demux and filter banks each correspond to a respective one of the six voice-grade telephone channels which are carried through the respective optical fiber and are transmitted through the respective transmultiplexer FDM port corresponding to the particular subscriber location. To minimize the bandwidth of the analog signal which corresponds to the six telephone channels, it may be preferable to transmit and receive each telephone signal as an analog vestigial sideband (VSB) signal.

The present invention, as exemplified by the embodiment of FIGS. 1–4, provides a number of advantages, including the following. For example, the arrangement provided in accordance with the invention makes it possible to provide telephone service to individual telephones without requiring individual voice-frequency ports on the switch for each telephone. Voice-frequency ports are generally much more expensive per channel than the TDM switch ports which are connected to the transmultiplexer in accordance with the invention.

In addition, the arrangement of the present invention allows more than one telephone to be served over the same transmission link by using frequency division multiplexing, but without requiring that individual FDM channel units be provided at the switch for each telephone. Also, since the same frequency band is reused for each of the FDM ports, the present invention economizes on the bandwidth needed for telephony, which leaves maximum room for broadband services.

The invention as illustrated in FIGS. 1–4 also economizes on the number of TDM ports and TDM channels which are required on the switch and the transmultiplexer. Because channels from different TDM ports can be assigned to the same FDM port, and vice versa, the number of TDM ports that must be provided is no more than the number required to supply as many TDM channels as there are telephones to be served.

Moreover, the arrangement of FIGS. 1–4 facilitates growth in the number of subscriber lines served, and changes (adds and drops). As it becomes necessary to add fiber links to new subscriber locations or new phones on pre-existing links, all the channels on currently existing TDM ports can be utilized before it becomes necessary to add a new TDM port. When a subscriber's phone is removed from service, the corresponding TDM channel is then made available for use by a new phone, which may be either at the same or at a different subscriber location.

In the embodiment described above, six voice-grade telephone channels are provided over each fiber to the respective subscriber location. Of course, the number of telephone channels provided to each subscriber location may be more or less than six. For example, four or eight channels may be provided to each location. It is also contemplated to run more than one optical fiber to a particular subscriber location.

Figure 5:
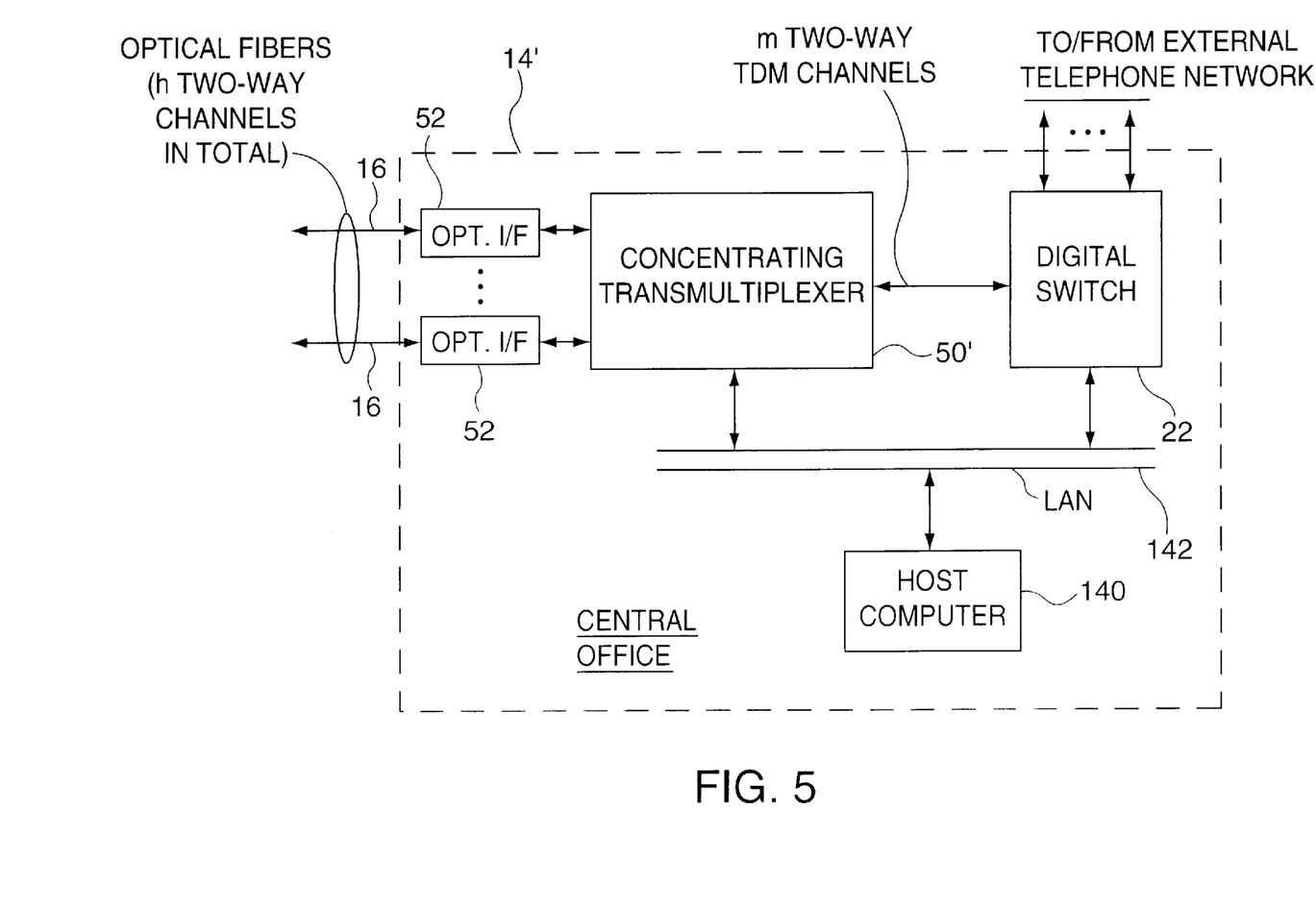
FIG. 5 is a block diagram illustration of an alternative embodiment of the central office arrangement shown in FIG. 1.

FIG. 5 illustrates an alternative central office arrangement, in which the teachings of the above-referenced application Ser. No. 08/726,641 are applied to the communication system of FIG. 1. The modified central office arrangement 14' of FIG. 5 includes the same interface devices 52 and digital switch 22 which were referred to above in connection with FIG. 2 and FIG. 1, respectively. However, for the purposes of the arrangement of FIG. 5, the digital switch 22 should be of the type which includes a host interface link feature to permit the switch to be controlled by command messages transmitted from a host computer 140.

The essential difference between the transmultiplexer 50' shown in FIG. 5 and the transmultiplexer 50 discussed in connection with FIG. 2 is a channel concentration function that is provided in the transmultiplexer 50'. As a result of this function, the total number of TDM channels which interconnect the multiplexer 50' and the digital switch 22 in FIG. 5 is a number (m) which is less than the total number of voice-grade telephone channels (shown as n in FIG. 5) which are collectively provided by means of the fibers 16. For example, m may be equal to 30 or 60, whereas n may be equal to 120.

A local area network (LAN) 142 provides a data messaging capability between the host computer 140 and the digital switch 22, while also permitting digital messaging between the host computer 140 and the transmultiplexer 50'.

In the arrangement of FIG. 5, capabilities for broadband and auxiliary services are preferably present but are not indicated in the drawing.

Figure 6:
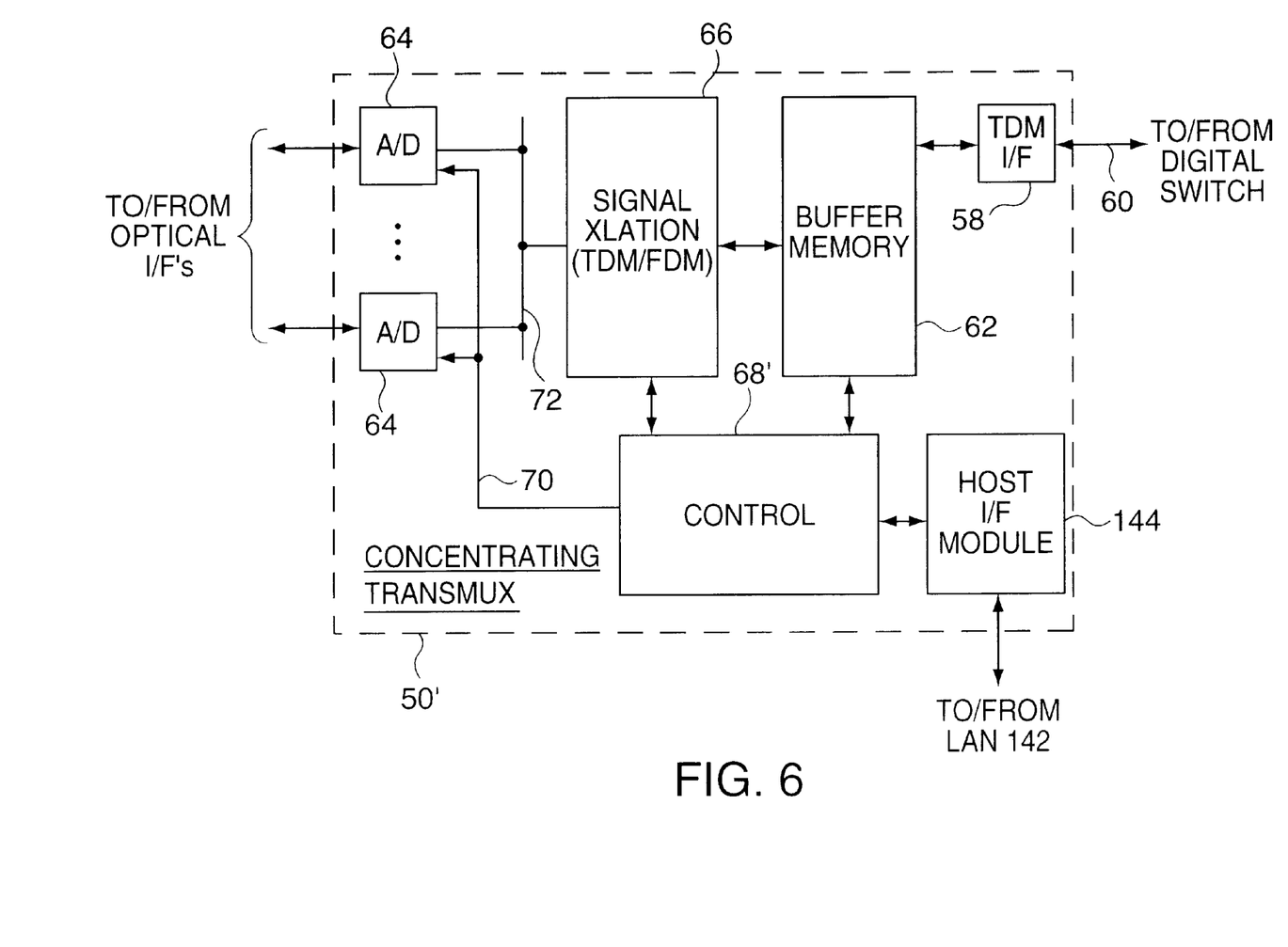
FIG. 6 is a block diagram which illustrates details of a concentrating transmultiplexer which is shown in FIG. 5.

The arrangement of the transmultiplexer 50' is illustrated in block diagram form by FIG. 6. It will be noted that most of the components of the transmultiplexer shown in FIG. 2 are also present in the concentrating transmultiplexer 50' of FIG. 6. However, in the concentrating transmultiplexer, the number of TDM ports and interfaces 58 is reduced, perhaps to only one interface 58, as shown in FIG. 6. In addition, a host interface module 144 is included in the concentrating transmultiplexer. The host interface module 144 interconnects the control circuit 68' shown in FIG. 6 with the LAN 142, and provides a conduit for messaging between the control circuit 68' and the host computer 140.

The essential difference between the transmultiplexer shown in FIG. 6 and that of FIG. 2, is that in the transmultiplexer of FIG. 2, the assignment of a particular subscriber phone line to a particular TDM channel persists for a considerable time, perhaps as long as the subscriber line remains in service, which may be a period of months or years. On the other hand, in the concentrating transmultiplexer shown in FIG. 6, assignment of a subscriber line to a TDM channel is made only upon demand for a particular telephone call, and the assignment of a subscriber line to a TDM channel typically is terminated at the end of the telephone call.

Figure 7:
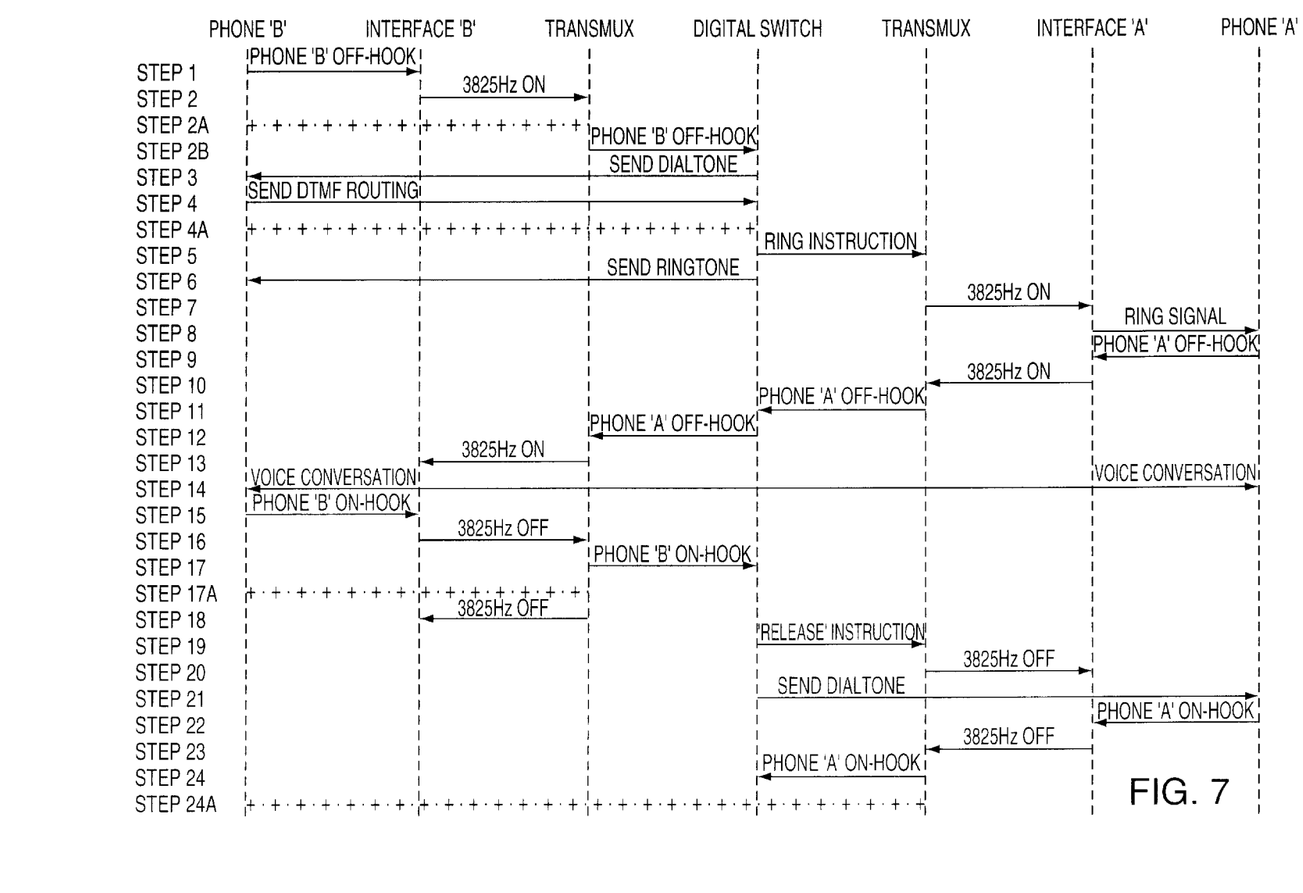
FIGS. 7 and 8 together form a timing chart which illustrates an operation of the system of FIG. 1, but with the central office arrangement of FIG. 5 substituted therein.
Figure 8:
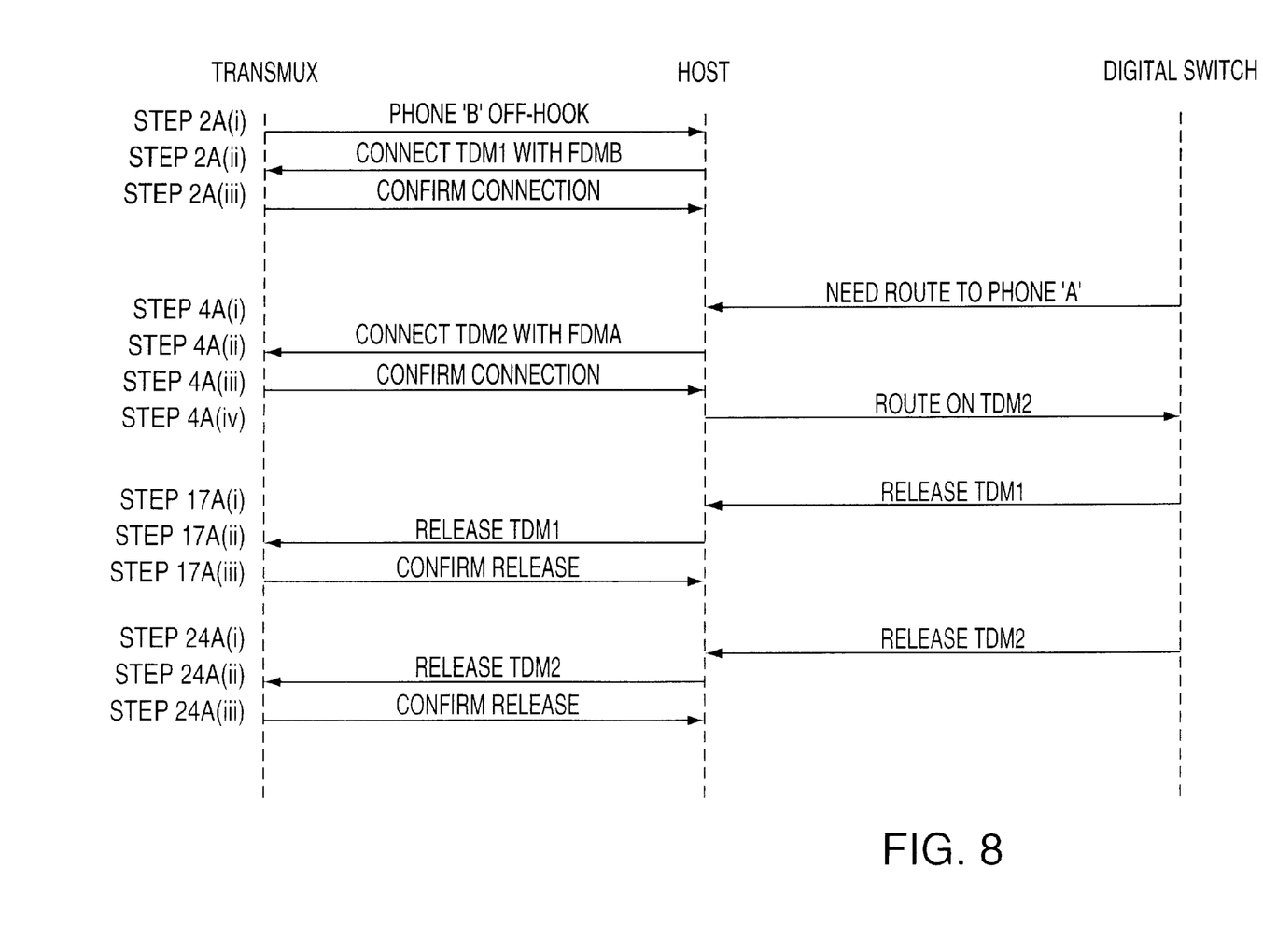

FIGS. 7 and 8 schematically show the sequence of events which occur in the embodiment of FIGS. 5 and 6 when a call is placed from phone B (assumed to be in one subscriber location 12) to phone A (assumed to be in a different one of the subscriber locations 12).

Step 1 (FIG. 7):—PHONE B OFF-HOOK—; When phone B goes off-hook, an interface (not shown) connected to phone B detects a change in the state of the associated tip and ring lines.

Step 2:—3825 Hz ON—; the interface for phone B causes a 3825 HZ tone to be continuously transmitted to the transmultiplexer 50'.

Step 2A(i) (FIG. 8):—PHONE B OFF-HOOK—; The 3825 Hz tone is received at the transmultiplexer 50'. The host interface module 144 then receives from control circuit 68' a signal which indicates that phone B has gone off-hook, and a corresponding status message containing the identity of phone B is dispatched from the host interface module 144 to the host computer 140 via LAN 142.

Step 2A (ii):—CONNECT TDM1 WITH FDMB—; Upon receiving the status message, the host computer, which controls the busy/idle status of the TDM channels, determines if any TDM channels connected to the transmultiplexer 50' are idle, and if so, dispatches a command message to the host interface module 144 directing that the FDM channel corresponding to phone B be assigned to an idle TDM channel (in this case assumed to be TDM channel 1).

Step 2A (iii):—CONFIRM CONNECTION—; The transmultiplexer complies with the command from the host computer by assigning FDM channel B to TDM channel 1 in the manner described above, and then sends a status message confirming the assignment to the host computer.

Step 2B (FIG. 7):—PHONE B OFF HOOK—; As a result of receiving and detecting the 3825 Hz tone in FDM channel B according to Step 2A(i) above and of assigning FDM channel B to TDM channel 1 according to Step 2A (iii) above, an off-hook signal is transmitted to the digital switch 22 in the TDM control channel corresponding to TDM channel 1.

Step 3:—SEND DIALTONE TO PHONE B—; The digital switch 22 places a dialtone signal in the voice channel for TDM channel 1, and the dialtone is delivered to phone B via the transmultiplexer 50' and the corresponding optical fiber Step 4:—SEND DTMF PHONE NUMBER—; Upon receiving dial tone, the DTMF phone number of phone A is transmitted from phone B to the digital switch 22, via the transmultiplexer 50'. At the switch 22, the DTMF phone number dialed is looked up in a memory and found to correspond to another subscriber connected to the switch, namely phone A.

Step 4A (i) (FIG. 8):—NEED ROUTE TO PHONE A—; Having determined that the call initiated at phone B is to be terminated at phone A, the digital switch 22 dispatches to the host computer 140 a message requesting routing instructions in order to complete the connection to phone A. The digital switch 22 then waits for instructions from the host 140.

Step 4A (ii):—CONNECT TDM2 WITH FDMA—; In response to the routing request received from the digital switch 22, the host 140 selects an idle TDM channel and dispatches a command message containing the identity of phone A to the transmultiplexer 50' (via its host interface module 144), directing that the FDM channel corresponding to phone A be assigned to the selected TDM channel, assumed in this case to be channel 2.

Step 4A (iii):—CONFIRM CONNECTION—; The transmultiplexer complies with the command to assign FDM channel A to TDM channel 2 and sends to the host computer a status message confirming the assignment.

Step 4A (iv):—ROUTE ON TDM 2—; To complete the connection between phones A and B, the host computer 140 directs the digital switch 22 to route the call from phone B (assigned to TDM channel 1) for connection to the TDM channel 2 which has been assigned to phone A.

Step 5 (FIG. 7):—RING INSTRUCTION—; The digital switch 22 sends a message in the control channel of the TDM signal channel assigned to phone A instructing the transmultiplexer 50' to apply a 3825 Hz tone on the FDM channel which corresponds to phone A.

Step 6:—SEND RING TONE TO ORIGINATOR—; The digital switch 22 then sends a ringing tone to phone B via the TDM channel 1 and, after passage through the transmultiplexer 50', via the FDM channel corresponding to phone B.

Step 7:—3825 Hz ON—; The transmultiplexer 50' turns on the 3825 Hz signal for the FDM channel corresponding to phone A.

Step 8:—RING SIGNAL—; An interface (not shown) connected to phone A detects the presence of the 3825 Hz signal and causes phone A to ring.

Step 9:—PHONE A OFF-HOOK—; When phone A is answered, there is a detectable change in the state of the associated tip and ring lines.

Step 10:—3835 Hz ON—; The interface connected to phone A detects the change in state on the tip and ring lines of phone A and transmits a continuous 3825 Hz tone to the transmultiplexer 50' via the FDM channel corresponding to phone A. At the same time, the ring signal on the tip and ring lines of phone A is disasserted.

Step 11:—PHONE A OFF-HOOK—; Transmultiplexer 50' detects the presence of the 3825 Hz tone in the FDM channel corresponding to phone A and transmits an off-hook signal to the switch 22 via the TDM control channel corresponding to TDM channel 2 which has been assigned to phone A.

Steps 12 and 13:—PHONE A OFF-HOOK—and—3825 Hz ON—; These steps are provided to indicate to the transmultiplexer 50' and the interface for phone B that phone A has answered.

Step 14:—VOICE CONVERSATION—. At this time digital switch 22 and transmultiplexer 50' have, pursuant to commands received from the host computer 140, established a virtual talk path between the calling phone B and the called phone A. The path has been implemented by assigning previously idle TDM channel 1 to the FDM channel corresponding to phone B, assigning previously idle TDM channel 2 to the FDM channel corresponding to phone A, and establishing a connection at switch 22 between the TDM channels 1 and 2. Bi-directional conversation can now occur.

Step 15:—PHONE B ON-HOOK—; When phone B goes on-hook (i.e., hangs up) to terminate the telephone call, the interface for phone B detects a change in the state of the associated tip and ring lines.

Step 16:—3825 Hz OFF—; The interface for phone B causes the 3825 Hz tone to be turned off.

Step 17:—PHONE B ON-HOOK—; Transmultiplexer 50' detects the absence of the 3825 Hz tone on the FDM channel corresponding to phone B and transmits an on-hook signal to the digital switch 22 in the control channel of the TDM channel 1 which had been assigned to phone B.

Step 17A (i) (FIG. 6):—RELEASE TDM1—; Upon receiving the on-hook signal, the digital switch 22 advises the host computer 140 that TDM channel 1 should be released from its assignment to phone B.

Step 17A (ii):—RELEASE TDM1—; The host computer sends a command message to transmultiplexer 50' directing that TDM1 be released.

Step 17A (iii):—CONFIRM-RELEASE—; In response to the release command received from the host computer, the transmultiplexer 50' dis-assigns TDM channel 1 from the FDM channel corresponding to phone B. This renders TDM channel 1 idle and available for assignment to another subscriber phone line. The transmultiplexer then sends to the host computer a status message to confirm that TDM channel 1 has been released.

Step 18 (FIG. 7):—3825 Hz OFF—; Transmultiplexer 50' provides to the interface for phone B an indication that the telephone channel connection has been broken.

Step 19:—"RELEASE" INSTRUCTION—; Digital switch 22 sends an on-hook signal to transmultiplexer 50' to indicate that the connection that was established at step 14 above between TDM channels 1 and 2 has been removed.

Step 20:—3825 Hz OFF—; Transmultiplexer 50' sends a signal to the interface for phone A to indicate that the connection is no longer available.

Step 21:—SEND DIALTONE TO PHONE A—; The digital switch places a dialtone signal in the voice channel for TDM channel 2, and the dialtone is delivered to phone A.

Step 22:—PHONE A ON-HOOK—; When phone A is placed on-hook, there is a detectable change on its associated tip and ring lines.

Step 23:—3825 Hz OFF—; The interface for phone A detects the change in state and ceases the transmission of the 3825 Hz tone on the FDM channel corresponding to phone A.

Step 24:—PHONE A ON-HOOK—; Transmultiplexer 50' sends an on-hook signal to the digital switch 22 to indicate that phone A has gone on-hook.

Step 24A (i) (FIG. 8):—RELEASE TDM2—; Upon receiving the on-hook signal, the digital switch advises the host computer that TDM channel 2 should be released from its assignment to phone A.

Step 24A (ii):—RELEASE TDM2—; The host computer sends a command message to transmultiplexer 50' directing that TDM2 be released.

Step 24A (iii):—CONFIRM RELEASE—; The transmultiplexer 50' releases the assignment of TDM channel 2 to the FDM channel corresponding to phone A and sends a status message to the host computer confirming release of TDM channel 2.

The above-described process is repeated for subsequent phone conversations.

In the example just given, the 3825 Hz signalling tone is asserted in connection with establishing the telephone call and is disasserted in connection with ending the call. However, the equipment could be arranged so that the 3825 Hz signalling is performed with the opposite polarity, i.e., by disasserting the tone to set up the call and asserting the tone to end the call.

As was noted in the above-referenced application Ser. No. 08/726,641, by providing a concentrating, computer-controlled transmultiplexer like that shown in FIG. 6, it becomes possible to adaptively share among a plurality of subscriber lines, a smaller plurality of digital switch ports, thereby achieving significant savings in the provisioning of switch interface equipment.

Figure 9:
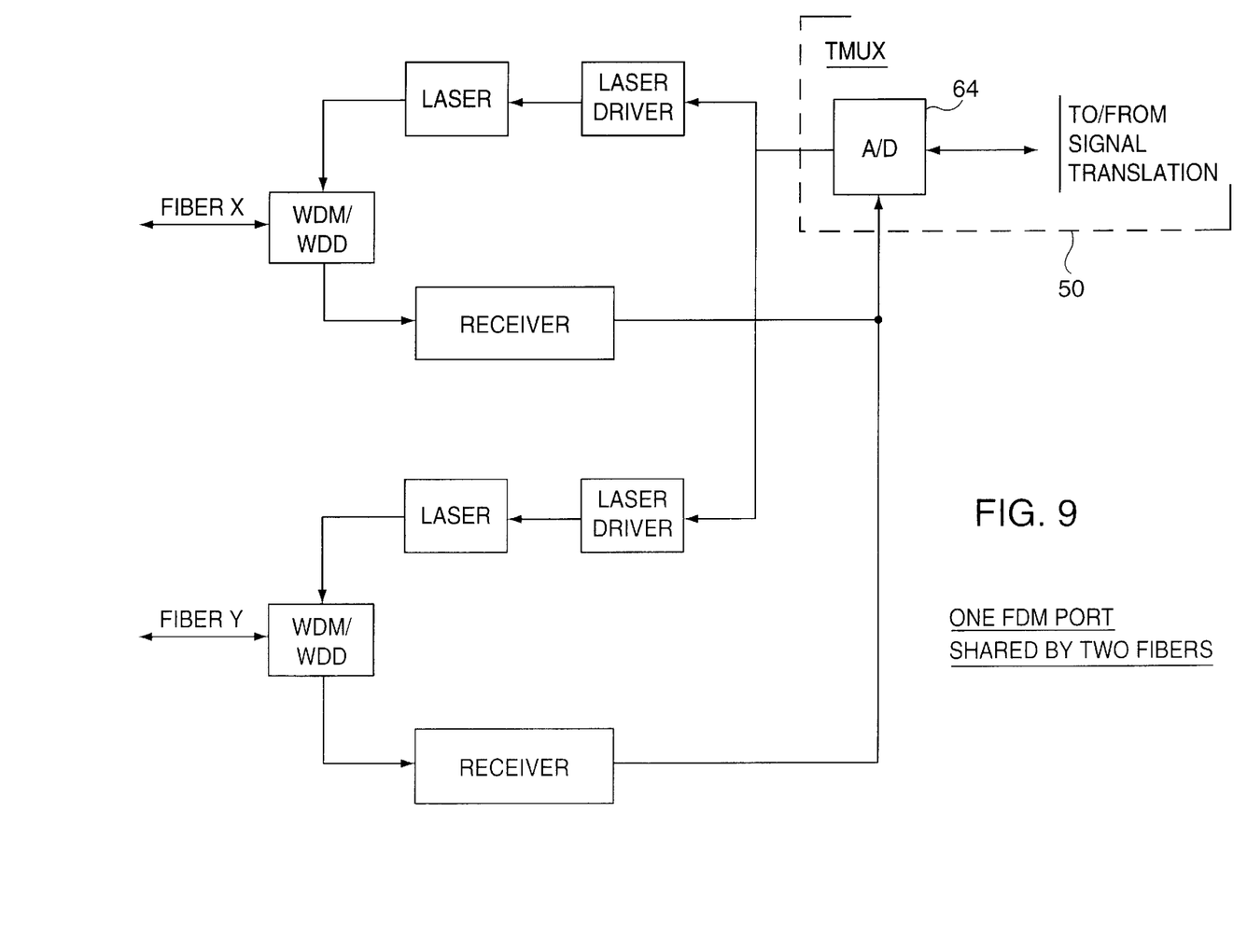
FIG. 9 shows in the form of a block diagram an arrangement in which two optical fibers share a single transmultiplexer port according to an alternative embodiment of the invention.

Up to this point, it has been assumed that there is a one-to-one correspondence between the optical fibers and the FDM ports provided on the downstream side of the transmultiplexer. However, it is also contemplated to have more than one fiber connected to a given FDM port, so that two or more subscriber locations may share a single FDM port. A suitable arrangement for this purpose is shown in FIG. 9. The arrangement of FIG. 9 will be readily understood by comparison with FIG. 3. In the arrangement of FIG. 9, different subscriber locations which share the same FDM port use different FDM channels within that port. In FIG. 9, no broadband or-auxiliary services are shown as being provided. However, it is possible, although not required, that such services be available through the arrangement of FIG. 9.

In all cases, it is to be understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A system for transmitting public-switched-telephone-network signals between a digital switch installed at a central office location and a plurality of telephone subscriber locations, the system comprising:

a plurality of optical fibers, each interconnecting a respective one of the subscriber locations with the central office location;

a first plurality of optical transceiver means, each connected to a respective one of said optical fibers at the central office location, each said transceiver means for transmitting a downstream signal to the respective subscriber location over the respective optical fiber by analog light wave modulation and for receiving and demodulating an upstream signal transmitted from the respective subscriber location over the respective optical fiber by analog light wave modulation; and a second plurality of optical transceiver means, each located at a respective one of the subscriber locations and connected to the respective optical fiber, each said transceiver means of the second plurality for transmitting an upstream signal to the central office location over the respective optical fiber by analog light wave modulation and for receiving and demodulating a downstream signal transmitted from the central office location over the respective optical fiber by analog light wave modulation;

said upstream and downstream signals transmitted via each one of said optical fibers including signals which correspond to at least two voice-grade analog telephone channels;

the system further comprising a transmultiplexer which includes:

at least one digital signal port connected to said digital switch for receiving digital telephone signals from said digital switch in a time division multiplexed (TDM) format and for transmitting digital telephone signals in said TDM format to said digital switch, said telephone signals received and transmitted by said at least one digital signal port corresponding to a plurality of voice-grade digital telephone channels;

a plurality of analog signal ports each connected to a respective one of said optical transceiver means of said first plurality, each of said analog signal ports for receiving analog telephone signals in a frequency division multiplexed (FDM) format from the respective optical transceiver means of said first plurality and for transmitting analog telephone signals in said FDM format to the respective optical transceiver means of said first plurality;

means connected between said at least one digital signal port and said plurality of analog signal ports for translating said telephone signals between said TDM and FDM formats; and control means for selectively coupling any one of said voice-grade digital telephone channels to any one of said voice grade analog telephone channels.

2. A system according to claim 1, wherein said at least one digital signal port has a total capacity of m voice-grade digital telephone channels and said plurality of analog signal ports collectively have a total capacity of n voice-grade analog telephone channels, with n>m.

3. A system according to claim 2, with n≧2 m.

4. A system according to claim 2, wherein said control means includes means for receiving a command message from a host computer, said command message indicating a particular one of said analog telephone channels and a particular one of said digital telephone channels, said control means also including assignment means for assigning said particular one of said analog telephone channels to said particular one of said digital telephone channels in response to said command message received from said host computer.

5. A system according to claim 4, wherein said assignment means includes sequencing means having:

a buffer memory for temporarily storing digital signals carried in said digital telephone channels; and memory control means for controlling said buffer memory so that said digital signals are written into said buffer memory according to a first sequence and are read out from said buffer memory according to a second sequence different from said first sequence, said memory control means including means for varying at least one of said first sequence and said second sequence in response to said received command message.

6. A system according to claim 1, wherein said control means includes means for receiving a programming signal, said programming signal indicating a particular one of said analog telephone channels and a particular one of said digital telephone channels, said control means also including assignment means for assigning said particular one of said analog telephone channels to said particular one of said digital telephone channels in response to said programming signal.

7. A system according to claim 6, wherein said assignment means includes sequencing means having:

a buffer memory for temporarily storing digital signals carried in said digital telephone channels; and memory control means for controlling said buffer memory so that said digital signals are written into said buffer memory according to a first sequence and are read out from said buffer memory according to a second sequence different from said first sequence, said memory control means including means for varying at least one of said first sequence and said second sequence in response to said received programming signal.

8. A system according to claim 1, wherein:

each of said optical transceiver means of said first plurality includes a respective laser for transmitting an optical signal in a downstream direction in the respective optical fiber, all of said lasers operating at a first wavelength; and each of said optical transceiver means of said second plurality includes a respective laser for transmitting an optical signal in an upstream direction in the respective optical fiber, all of said lasers of said optical transceiver means of said second plurality operating at a second wavelength that is different from said first wavelength.

9. A system according to claim 8, wherein said first wavelength is substantially 1310 nm and said second wavelength is substantially 1550 nm.

10. A system according to claim 1, wherein said optical transceivers are arranged to provide up to six voice-grade analog telephone channels in each of said optical fibers.

11. A system according to claim 10, further comprising means for transmitting broadband signals in said optical fiber simultaneously with said telephone signals.

12. A system according to claim 11, wherein said broadband signals are transmitted in a downstream direction from said central office location to said subscriber locations and in an upstream direction from said subscriber locations to said central office location.

13. A system according to claim 1, wherein at least one of said analog signal ports is connected to two optical transceiver means, a first one of said two optical transceiver means being connected to first optical fiber which extends to a first subscriber location, and a second one of said two optical transceiver means being connected to a second optical fiber which extends to a second subscriber location that is different from said first subscriber location.

14. A telecommunications system, comprising:
a central office location;
a plurality of telephone subscriber locations;
a plurality of optical fibers, each extending between said central office location and a respective one of said telephone subscriber locations, said optical fibers for guiding optical telephone signals between said central office and said subscriber locations; said optical telephone signals corresponding to a plurality of analog transmitting channels and a like plurality of analog receiving channels between each of said telephone subscriber locations and said central office location, said optical telephone signals also including signalling information; and
switching means at said central office location and responsive to said optical telephone signals for enabling said analog transmitting channels to be selectively coupled to said analog receiving channels, whereby voice communication between the subscriber locations of the coupled channels is enabled, said switching means including:
transmultiplexer means for selectively assigning to each analog transmitting channel a corresponding digital transmitting channel for carrying digital voice information corresponding to analog voice information carried by the corresponding analog transmitting channel and for selectively assigning to each analog receiving channel a corresponding digital receiving channel for carrying digital voice information corresponding to analog voice information carried by the corresponding analog receiving channel, said digital channels being in a time division multiplexed (TDM) format; said transmultiplexer means including a plurality of analog signal ports for transmitting and receiving electrical signals in a frequency division multiplexed (FDM) format;
coupling means for coupling each of said analog signal ports to a respective one of said optical fibers, said coupling means converting said FDM electrical signals transmitted by said analog signal ports of said transmultiplexer means into analog optical signals to be transmitted to said telephone subscriber locations via said optical fibers, and said coupling means converting analog optical signals from said telephone subscriber locations received at said coupling means into said FDM electrical signals received at said analog signal ports; and
a digital switch at said central office location for selectively coupling the digital transmitting channels to the digital receiving channels.

15. A telecommunications system according to claim 14, wherein said switching means further includes:
a host computer for generating command signals; and
means interconnecting said host computer, said digital switch and said transmultiplexer means for transmitting respective ones of said command signals from said host computer to said digital switch and said transmultiplexer means;
said digital switch performing said coupling of said digital transmitting channels to said digital receiving channels in response to command signals transmitted from said host computer; and
said transmultiplexer means performing said assignment of said analog transmitting channels to said digital transmitting channels and said assignment of said analog receiving channels to said digital receiving channels in response to command signals transmitted from said host computer.

16. A telecommunications system according to claim 15, wherein said host computer is at said central office location.

17. A telecommunications system according to claim 15, wherein said analog signal ports of said transmultiplexer means have a total capacity of n voice-grade analog signal channels, and a total m voice-grade digital signal channels are available for assignment by said transmultiplexer means to said voice-grade analog signal channels, n and m being integers, with n>m.

18. A telecommunications system according to claim 17, wherein n≧2 m.

19. A telecommunications system according to claim 17, wherein n≧120.

20. A telecommunications system according to claim 19, wherein said transmultiplexer means is coupled to no more than 20 of said optical fibers.

21. A telecommunications system according to claim 15, wherein said interconnecting means includes a local area network.

22. A telecommunications system according to claim 14, further comprising means for coupling a plurality of broadband video signal channels to said optical fibers for transmission to said telephone subscriber locations in the form of optical signals.

23. A telecommunications system according to claim 14, wherein at least one of said analog signal ports is coupled to two optical fibers, including a first optical fiber which extends to a first subscriber location and a second optical fiber which extends to a second subscriber location that is different from said first subscriber location.

24. A transmultiplexer, comprising:
at least one TDM interface for receiving and transmitting digital telephone signals in a TDM format from and to a digital signal transmission facility;
a buffer memory coupled to said at least one TDM interface for temporarily storing said digital telephone signals;
translation means coupled to said buffer memory for translating said digital telephone signals between said TDM format and an FDM format;
a plurality of FDM ports for receiving and transmitting analog telephone signals in said FDM format;
a plurality of A/D conversion means, each coupled between a respective one of said FDM ports and said translation means, said A/D conversion means for converting analog telephone signals into digital telephone signals in said FDM format, and for converting digital telephone signals in said FDM format into analog telephone signals; and
control means coupled to said buffer memory means, said translation means and said A/D conversion means, for transmitting control signals to:
control respective durations of periods during which said buffer memory stores said digital telephone signals in said TDM format;
control said translation means to transmit and receive digital signals in said FDM format to and from selected ones of said A/D conversion means; and
control selected ones of said A/D conversion means to receive and transmit digital signals in said FDM format from and to said translation means.

25. A transmultiplexer according to claim 24, wherein said control means includes means for receiving and storing a programming signal, said programming signal indicating that said transmultiplexer is to assign a particular voice-grade digital signal channel included in said digital signal transmission facility to a particular voice-grade analog signal channel provided by a particular one of said FDM ports.

26. A transmultiplexer according to claim 24, wherein said control means includes means for receiving and storing a command signal sent to said transmultiplexer by a host computer, said command signal indicating that said transmultiplexer is to assign a particular voice-grade digital signal channel included in said digital signal transmission facility to a particular voice-grade analog signal channel provided by a particular one of said FDM ports.

27. A transmultiplexer according to claim 26, wherein said plurality of FDM ports collectively have a total capacity of n voice-grade analog signal channels and said at least one TDM interface has a total capacity of m voice-grade digital signal channels; n and m being integers with n>m.

* * * * *